United States Patent
Erden et al.

(10) Patent No.: US 9,666,213 B1
(45) Date of Patent: May 30, 2017

(54) UPDATING A PARTIALLY OVERLAPPED TRACK VIA TWO OR MORE READERS

(71) Applicant: Seagate Technology LLC, Cupertino, CA (US)

(72) Inventors: Mehmet Fatih Erden, St. Louis Park, MN (US); Steven Douglas Granz, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/196,578

(22) Filed: Jun. 29, 2016

(51) Int. Cl.
*G11B 5/09* (2006.01)
*G11B 20/12* (2006.01)

(52) U.S. Cl.
CPC ............ *G11B 5/09* (2013.01); *G11B 20/1217* (2013.01); *G11B 2020/1238* (2013.01); *G11B 2020/1292* (2013.01)

(58) Field of Classification Search
None
See application file for complete search history.

(56) References Cited

U.S. PATENT DOCUMENTS

| | | | | |
|---|---|---|---|---|
| 8,873,178 B2* | 10/2014 | Erden | ............... | G11B 20/1217 360/39 |
| 8,982,496 B1* | 3/2015 | Maeto | .................... | G11B 15/10 360/61 |
| 9,305,596 B2* | 4/2016 | Trantham | ............. | G11B 20/182 |
| 2010/0232057 A1 | 9/2010 | Sanvido et al. | | |
| 2014/0160590 A1 | 6/2014 | Sankaranarayanan et al. | | |

* cited by examiner

*Primary Examiner* — K. Wong
(74) *Attorney, Agent, or Firm* — Hollingsworth Davis, LLC

(57) ABSTRACT

In response to a command to update a target track, two tracks or more are concurrently read. The two tracks or more tracks include a top track that partially overlaps the target track. Data of the top track is stored in a memory, and the update data is written over at least part of the target track. The stored data is written on the recording medium over the top track or at a different location.

20 Claims, 7 Drawing Sheets

US 9,666,213 B1

UPDATING A PARTIALLY OVERLAPPED TRACK VIA TWO OR MORE READERS

SUMMARY

Various embodiments described herein are generally directed to updating an overlapped track via two or more readers. In one embodiment, in response to a command to update a target track, two or more tracks are concurrently read. A first of the two or more tracks includes a top track that partially overlaps the target track. Data of the top track is stored in a memory, and the update data is written over at least part of the target track. The stored data of the top track is written on the recording medium.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic data storage device such as hard disk drives (HDDs). With today's perpendicular magnetic recording (PMR) technology, conventional HDD architectures are close to the superparamagnetic limit, which restricts the minimum bit size on magnetic recording media. New technologies such as heat-assisted magnetic recording (HAMR) and bit-patterned media (BPM) can record data at target higher areal density (AD) than PMR assuming conventional one-dimensional (1-D) system designs and drive architectures.

Until new technologies such as HAMR and BPM become commercially available, some schemes have been developed to increase areal density using conventional, perpendicular recording heads and media. These schemes, such as shingled magnetic recording (SMR) and interlaced magnetic recording (IMR) generally involve writing some tracks that partially overlap previously written tracks. In conventional perpendicular recording drives, tracks are written apart from one another to reduce adjacent track interference (ATI). While adjacent track separation allows tracks to be updated independently, it can limit the number of tracks that can be written in view of other factors such as the size and strength of the magnetic field needed for writing.

Figure 1:
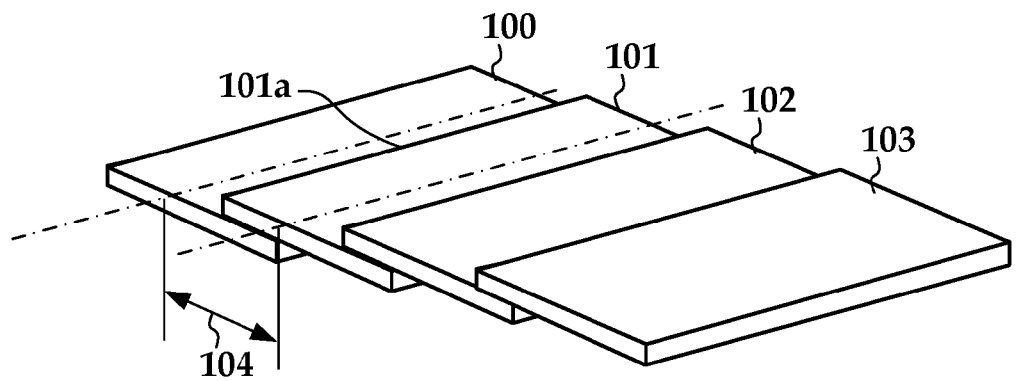
FIG. 1 is a diagram illustrating shingled magnetic recording according to an example embodiment.

Technologies such as SMR and IMR can provide increased track pitch by overlapping adjacent tracks. As shown in the block diagram of FIG. 1, an SMR recording process according to an example embodiment involves writing a bottom track 100, then writing a first top track 101 partially overwriting the bottom track 100, then writing a second top track 102 partially overwriting the first top track 101. This can continue for some number of tracks, e.g., additional top track 103, until a full band of data is written. It will be understood that the terms "top" and "bottom" as well as the representation of tracks in the figures as stacked blocks are for purposes of illustration and not limitation, e.g., the tracks are generally written on a common recording surface at different instances of time. By writing the tracks 100-103 with a width (crosstrack dimension) that is close to or greater than the track pitch 104, a stronger magnetic field can be used for recording. Further, the recording head can have a magnetic field shaped so that the overlapping edge (e.g., edge 101a) has a sharp magnetic gradient, allowing for increased linear bit density (number of bits per downtrack unit of distance) than if a more uniform field was used.

The bands of overlapping tracks in an SMR device are separated from one another using a guard region, such that each track band can be independently updated. However, within the track band, updating an individual track also involves updating any overlapping tracks. For example, updating track 100 in FIG. 1 will involve rewriting tracks 101-103, regardless of whether data in those tracks 101-103 changes. Assuming there were no additional tracks in this super-sector, updating track 102 would only involve the additional rewriting of track 103, and track 103 could be updated without rewriting any other tracks.

Note that if one or more unchanged top tracks are rewritten due to changes to a bottom track, then data from the top tracks will be read into a buffer first before writing commences. After writing the changes to the bottom track, the data is retrieved from the buffer and then rewritten using shingled writing as described above. Therefore, in a hard drive with a single reader/writer per track, for n-unchanged, shingled tracks that overlap an updated, bottom shingled track, n-additional spins are used to read in the data of the n-tracks and then n-additional spins are used rewrite the data for the n-tracks. This is a 2n spin penalty compared to a non-overlapped track. A device using IMR can also incur an analogous penalty when updating bottom tracks.

Figure 2:
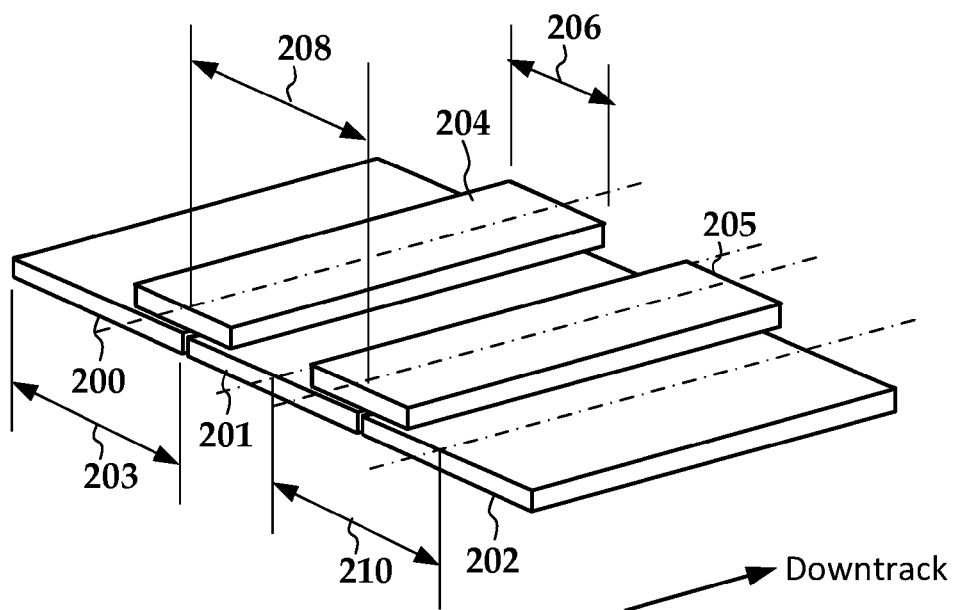
FIG. 2 is a diagram illustrating interlaced magnetic recording according to an example embodiment.

In FIG. 2, a block diagram illustrates IMR tracks according to an example embodiment. In this IMR process, bottom tracks 200-202 are first written on the recording medium using a relatively wide track width 203 and at bottom track pitch 210. Top tracks 204, 205 are then written partially overlapping respective bottom tracks 200-202. The top tracks are written at a narrower track width 206 and at top track pitch 208. Because the bottom tracks 200-202 can be written using a relatively higher magnetic field, the bottom tracks 200-202 can be written using a relatively higher linear bit density than the narrower, top tracks 204, 205. For a perpendicular recording head, different recording transducers (e.g., write poles) can be used to achieve the different widths 203, 206. For a HAMR device, the different widths 203, 206 can be achieved using a single write transducer, e.g., by varying laser power to vary the size of the hotspot in the recording medium.

In order to update a bottom track, e.g., track 201, one or more overlapping top tracks, e.g., tracks 204, 205 need to be rewritten whether or not the data in the top tracks is changed together with the bottom track. When at least part of the top track data does not need to be updated, then the writing of the bottom track involves reading and buffering this data from the top track before writing the bottom track, then rewriting the top track with the buffered data after the bottom track is written. Thus, for a drive with a single reader/writer per track, the updating of a bottom track may involve up to four additional spins. Two spins are used to read data from the top tracks and then two spins to re-write the top tracks. This is in addition to the one spin used to overwrite the bottom track.

In the above scenarios, a conventional read/write head is assumed, which includes a single read transducer and a single write transducer on the head-gimbal assembly (HGA). This conventional drive architecture constrains an inherently two-dimensional system to a one-dimensional system due, e.g., to cost and complexity considerations. These design constraints are being further explored to see if the current and future recording technologies can support higher AD and/or better drive performance. For example, some of those constraints can be modified to make the system utilize the two-dimensional nature of the media surface. This technology includes what is known as two-dimensional magnetic recording (TDMR).

A TDMR drive includes multiple read transducers that can read two or more tracks concurrently. The read transducers may be integrated into a single read head, may be part of separate read heads (e.g., sliders) commonly mounted on a single head-gimbal assembly (HGA), and/or may be mounted on separated HGAs on the same arm. For purposes of this disclosure, the terms "read transducer," "read sensor," "reader," and "magnetoresistive stack" may be used interchangeably. Similarly, the terms "write transducer," "writer," "write pole" may be used interchangeably. The readers in a TDMR drive may cover different regions of the media, and the signals from the readers can be read separately or combined.

Figure 3:
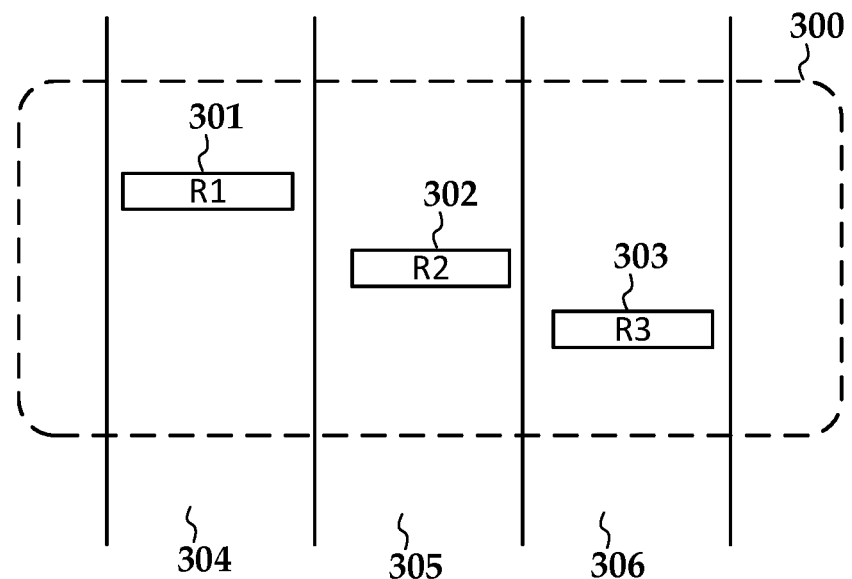
FIG. 3 is a block diagram showing three readers reading three tracks according to an example embodiment.

Regarding the SMR and IMR update scenarios noted above, a TDMR drive can provide performance improvements related to the time it takes to update overlapped tracks. This type of arrangement can be implemented with or without other TDMR features, such as multiple track decoding, multiple-bit level encoding/decoding, etc. In FIG. 3, a schematic diagram shows an HGA 300 that includes three readers 301-303 that independently read from three tracks 304-306, one of which is a bottom track that is partially overlapped by at least one of the other tracks. For example, track 305 could be an IMR bottom track that is partially overlapped by top tracks 304, 306. In another example, track 304 could be a bottom track partially overlapped by top track 305, and top track 305 is partially overlapped by second top track 306.

If a bottom one of the tracks 304-306 requires an update, the readers 301-303 can concurrently read existing data off of some or all of the three tracks 304-306 in a single rotation of the disk (or a partial rotation of the disk if only part of the track is updated). Note that there may be downtrack offsets between readers 301-303 due to device construction and/or skew. As such, the term "concurrent" is generally meant to convey the reading and writing of data that does not require serial traversal of different tracks by the same or different transducers, even though the track signals may be slightly offset in time from one another due to downtrack offsets of the reader. Concurrent reading allows, for example, reading two or more tracks in about one revolution of the recording medium.

The data read from the tracks 304-306 can be buffered, e.g., in volatile memory. The bottom track can then be partially or fully overwritten with at least some new data (and possibly some of the buffered data), and top tracks written with the buffered data, either partially overlapping the updated bottom track or written elsewhere. As will be described in greater detail below, the writing of the tracks can be performed in multiple passes by a single write transducer, or in fewer passes by more than one writer.

The example described above can be extended to fewer or more readers. In one example, the HGA 300 may just include readers 301 and 303. Assuming that the track 305 is an IMR bottom track and no data from track 305 needs to be read (e.g., entire track 305 or part of track 305 is completely rewritten), then only the corresponding data in tracks 304 and 306 may need to be buffered, and the read part of the update can still be done in a single rotation (or less) of the disk. This corresponding data in tracks 304, 306 may include the entire tracks or just a part of the tracks that encompasses the changed portions of the track 305 (see discussion of FIG. 7 below).

In another example, if just readers 301 and 302 are on the HGA 300, then tracks 304 and 305 could be read simultaneously in a single rotation. The HGA 300 is then repositioned (e.g., seeks one or two tracks over) so that track 306 can be read by one of the readers 301, 302 in another rotation. If the tracks 304-306 are shingled and bottom track 304 does not need to be read (e.g., entire track 304 or part of track 304 is completely rewritten), then only the corresponding data in tracks 305 and 306 may need to be buffered, and the buffering part of the update can still be done in a single rotation (or less) of the disk by reading tracks 305 and 306 in a single pass using readers 301, 302. The corresponding data in overlapping tracks 305, 306 may include the entire tracks or just a part of tracks that encompasses the changed portions of the track 304 (see discussion of FIG. 7 below).

In some cases, even if data read from a bottom track is not buffered for rewrite, there may still be reasons to read from the bottom track together with one or more top tracks. For example, data read from a bottom track may be used to cancel adjacent track interference when decoding an adjacent top track. In other cases, a reader positioned at or near a bottom track may be used to read in non-user data such as servo marks that facilitates accurately positioning one or more read/write heads over the targeted tracks.

Figure 4:
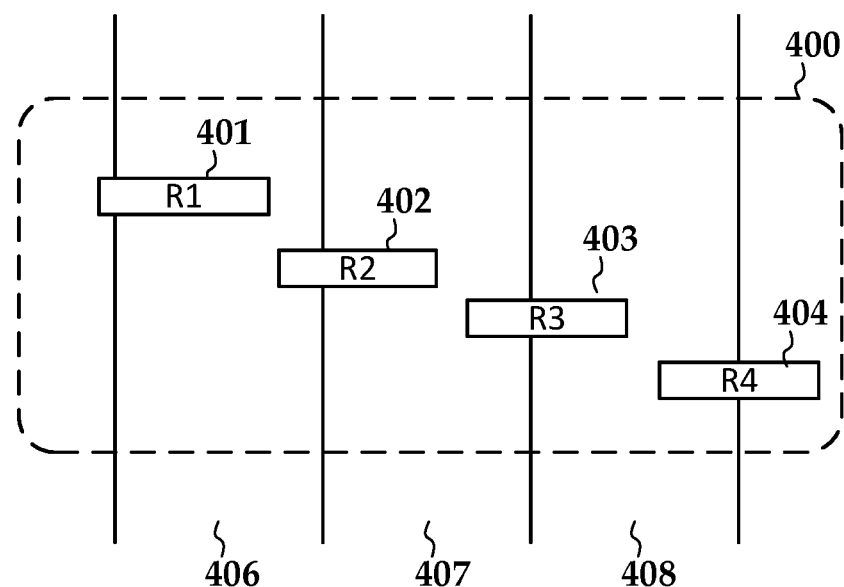
FIG. 4 is a block diagram showing four readers reading three tracks according to an example embodiment.

In general for these examples, r-readers can be used to read t-tracks, where r>1, and r≤t. In some cases where r<t, this may not always require an extra rotation to read in the required data for buffering, as when the bottom track or track/portion does not need to be read. In FIG. 4, a schematic diagram illustrates a similar case, but where r>t. The schematic diagram in FIG. 4 shows an HGA 400 that includes four readers 401-404 that read from three tracks 406-408, one of which is a bottom track that is overlapped by at least one of the other tracks. As with the previous example, the tracks 406-408 may be recorded using IMR or SMR. In this example, some of the readers 401-404 overlap more than one track. In such a case, joint decoding of the four reader signals may be used to recover the individual tracks. In other embodiments, the readers 401-404 may be arranged so that a subset of the readers 401-404 are positioned over the tracks 406-408 and the signals from that subset are used to read the tracks 406-408. In such a case, the subset may change based on such variables as skew angle, zone-dependent track geometry, etc.

Note that in the embodiments shown in FIGS. 3 and 4, the readers may have the same or different physical, magnetic, electrical characteristics. For example, the readers may have different cross-track widths and/or downtrack resolutions/sensitivities that are optimized for a particular type of track. In the case of IMR, the widths and/or downtrack resolution may differ depending on whether the reader is designed to read a bottom or top track. Other characteristics that may differ between readers include signal-to-noise ratio, magnetic sensitivity, skew angle, reader-to-writer separation, etc.

Figure 5:
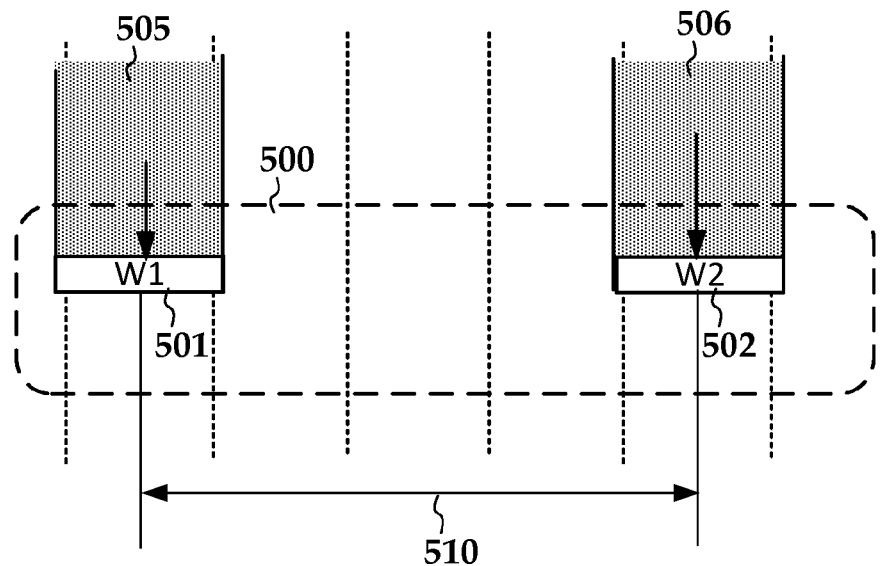
FIG. 5 is a block diagram showing two writers concurrently writing tracks according to an example embodiment.
Figure 6A:
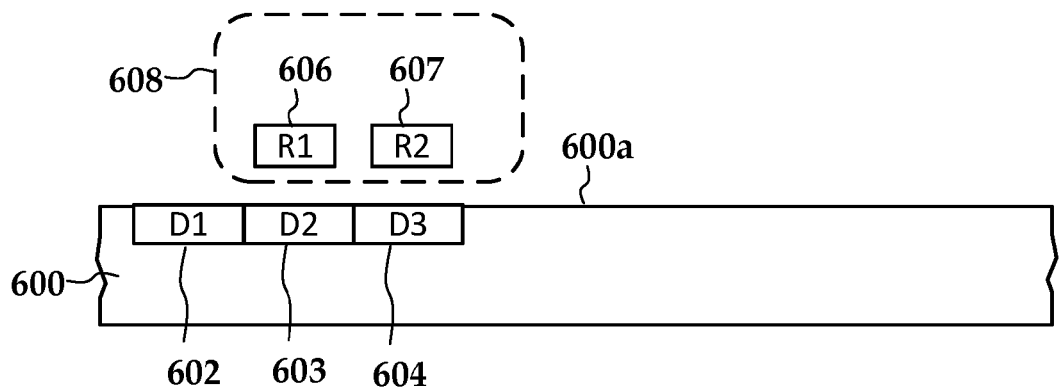
FIGS. 6A and 6B are block diagrams showing top tracks being rewritten to new locations according to an example embodiment.
Figure 6B:
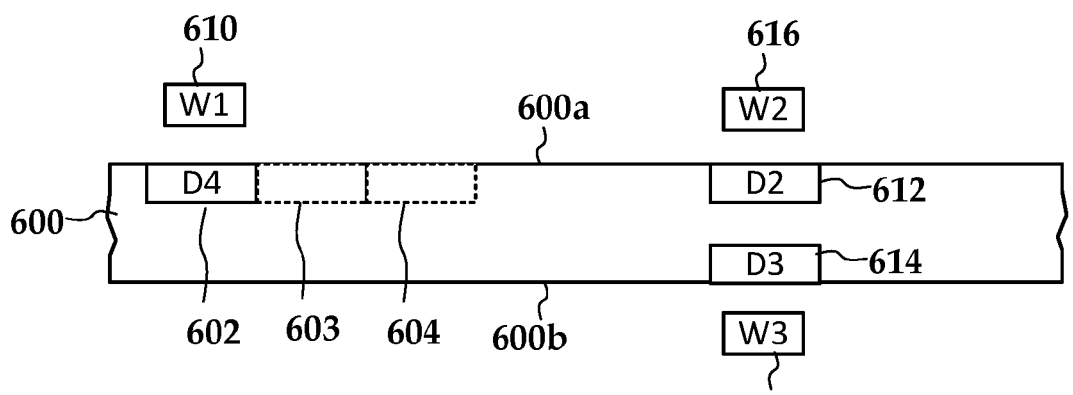

By reading multiple tracks with two or more readers, the amount of time needed to update an overlapped track can be significantly reduced. Similarly, if the overlapped and overlapping tracks can be written in fewer drive rotations, then this can further reduce update time. In FIGS. 5, 6A and 6B, block diagrams illustrate example multiple-writer embodiments that can decrease update times for overlapped tracks. In FIG. 5, two write transducers 501, and 502 on a single structure 500 are shown that can write a tracks 505, 506 in a single pass on the same surface of the recording medium. The arrows on the writers 501, 502 indicate a relative movement between the writers 501, 502 and the tracks 505, 506 (e.g., a spinning recording medium would move opposite the direction of the arrows while the writers 501, 502 are held stationary in a radial direction).

Note that a crosstrack offset 510 between the writers 501, 502 spans multiple tracks in this example. As such, the data from the original top tracks may be written to another location using the two writers. In the event it is possible to locate the writers 501, 502 close enough together in a crosstrack direction, then the writers 501, 502 may be used to write overlapping adjacent tracks concurrently, e.g., by offsetting the heads in a downtrack direction. The writers 501, 502 may write the same or different tracks widths. The different tracks widths may be a result of a physical difference in width of the writer component (e.g., conventional write pole) and/or may be obtained by varying the size of a thermal hotspot (e.g., HAMR writer). Writers 501, 502 are shown aligned in a downtrack direction, although may be offset in a downtrack direction from each other in some embodiments.

In FIG. 6A, a recording medium 600 is shown with three tracks 602-604 written on one surface 600a of the medium 600. Track 602 is overlapped by at least one of the other two tracks 603, 604, and track 602 is the target of an update request. The illustrated arrangement may correspond to shingled recording, where track 603, partially overlaps track 602 and track 604 partially overlaps track 603. For interlaced recording, track 602 may be positioned instead between top tracks 603, 604.

The update request will overwrite data D1 of the target track 602. As a result of writing to the target track 602, one or both of tracks 603, 604 could lose data due to adjacent track overlap. As a result, readers 606, 607 that are mounted on a common structure 608 first read data D2, D3 from the tracks 603, 602 and store the data in a memory. In the illustrated shingled arrangement, readers 606, 607 are configured to concurrently read adjacent tracks. In an interlaced arrangement, e.g., where track 602 is between tracks 603 and 604, the readers 606, 607 may be spaced apart to read non-adjacent tracks. After reading the data D2, D3, the target track 602 is updated as shown in FIG. 6B.

In FIG. 6B, a first writer 610 overwrites update data D4 over at least part of track 602. Update data D4 may include different data than originally stored in track 602 or the same data (e.g., refreshed in response to factors such as high bit error rate that indicate the track may become corrupted in the future). As indicated by dashed lines, this causes data formerly stored in tracks 603, 604 to be invalidated, and the tracks 603, 604 can be marked as available for storage of new data. The data D2, D3 formerly in tracks 603, 604 and stored in the memory are rewritten to new tracks 612, 614 by writers 616, 618. Tracks 612, 614 are in a different location than tracks 603, 604.

In this particular example, the tracks 612, 614 are on opposing surfaces 600a-b of the same disk. This allows the tracks 612, 614 to be written concurrently if the storage device is configured to operate writers 616, 618 concurrently. Tracks 612, 614 could be written serially in other embodiments. In other embodiments, data D2, D3 could be written to tracks the same surface, either the surface 600a on which the original tracks 603, 604 were written but in another location than tracks 603, 604, or another surface of the same disk 600 or different disk (not shown). In other embodiments, the data D2, D3 could be written to tracks on different surfaces of different disks, either serially or concurrently. Note that writers 610, 616 may be the same or different.

Figure 7:
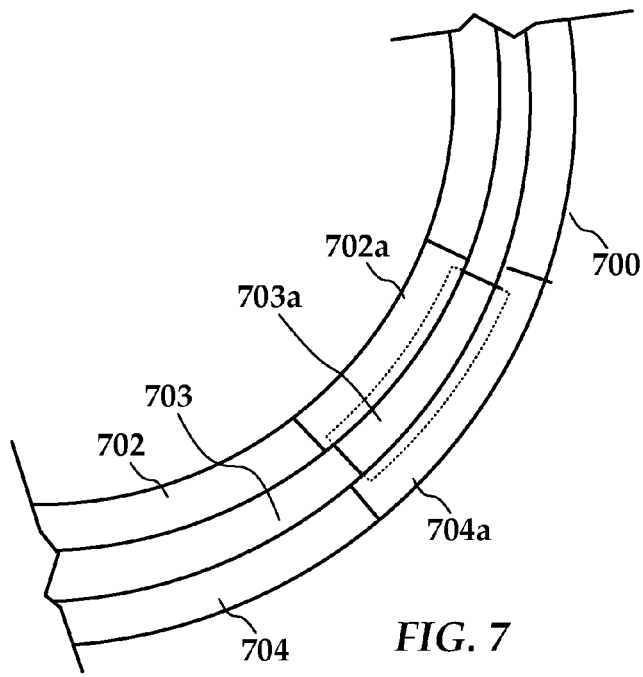
FIG. 7 is a diagram showing a partial update of an overlapped track according to an example embodiment.

In the description above, an update of a partially-overlapped track is described, which generally involves overwriting part of the data (e.g., one or more sectors) on the overlapped track. This also involves overwriting at least part of overlapping tracks due to SMR or IMR recording techniques used to write the track. As shown in the embodiment shown in FIG. 7, these updates may only affect parts of the overlapped and overlapping tracks. In FIG. 7, a recording medium 700 has IMR tracks 702-704 written on it, track 703 being a bottom track and tracks 702, 704 being top tracks. It will be understood that the concepts described in relation to FIG. 7 can be adapted for use in an SMR device.

An update to bottom track 703 (e.g., received via a host controller) results in the data in region 703a being overwritten. Because tracks 702, 704 were written to partially overlap track 703, the data in overlapping regions 702a, 704a may be compromised when region 703a is overwritten. Although the entirety of tracks 702 and 704 may be rewritten after overwriting region 703a, it may be possible to overwrite just regions 702a, 704a, e.g., if these regions 702a, 704a have a sector boundary or other well-defined limits that encompass region 703a.

Figure 8:
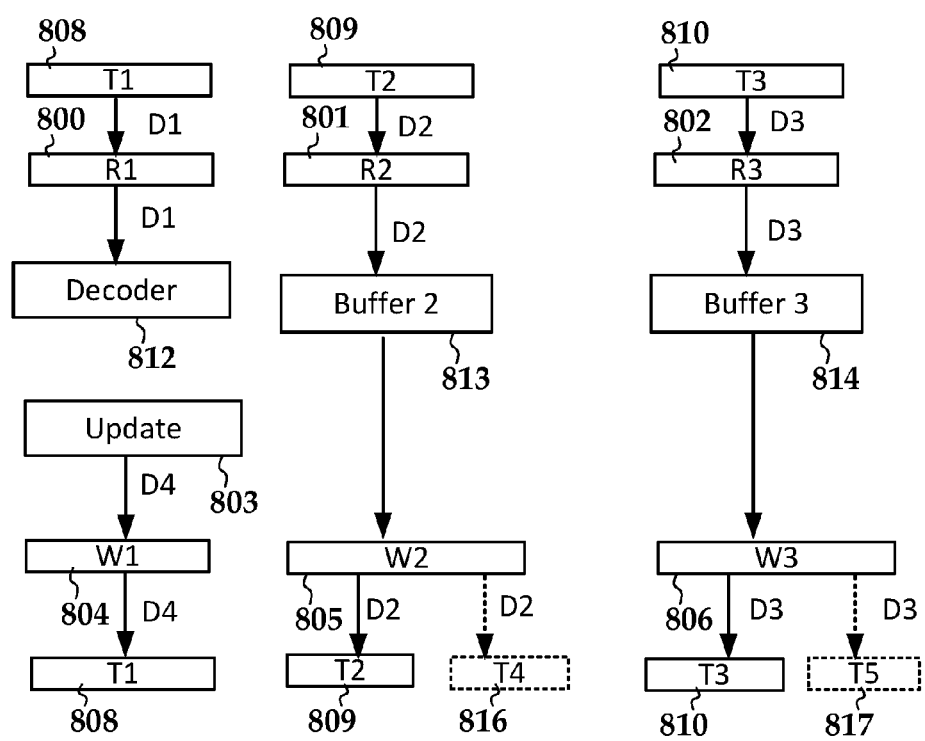
FIG. 8 is a schematic diagram of track update components according to an example embodiment.

In FIG. 8, a block diagram illustrates components used to update multiple tracks according to an example embodiment. In this example, three readers 800-802 and three writers 804-806 are shown. Tracks 808-810 are in either a shingled or interlaced configuration, with track 808 being partially overlapped by one or both of tracks 809, 810. In response to a request 803 to update overlapped track 808 with update data D4, at least readers 801, 802, which may be mounted to a common structure (e.g., head, HGA, arm), are positioned to concurrently read data D2, D3 from tracks 809, 810. The data D2, D3 is decoded and placed into one or more buffers 813, 814, which may be part of the same device memory. In some scenarios, reader 800 may also read data D1 from track 808 concurrently with the reading of tracks 809, 810, and the data D1 may also be stored in a buffer as well (not shown) and/or be used to decode data D2, D3 via decoder 812.

After buffering data D2, D3, the update data D4 is applied to track 808 via writer 804. Concurrently or serially with update of track 804, writers 805, 806 write buffered data D2, D3 either to the same track locations 809, 810, or different track locations 816, 817. In the former case, the tracks 809, 810 may be written using the same overlapping configuration (e.g., shingled, interlaced) as was previously used. In the latter case, the new tracks 816, 817 may use the same or different track writing architecture. Note that the writing of the tracks does not need to follow any particular order unless some overlapping occurs as part of the writing. For example, data D2, D3 may be written to tracks 816, 817 before data D4 is written to track 808, or the tracks 808, 816, 817 may be written in some other order. As with previous examples, the example in FIG. 8 can be extended to more or fewer readers and/or writers, and number of readers/writers does not need to directly correspond to the number of tracks being read from or written to. This arrangement may be used for both IMR and SMR storage devices.

Figure 9:
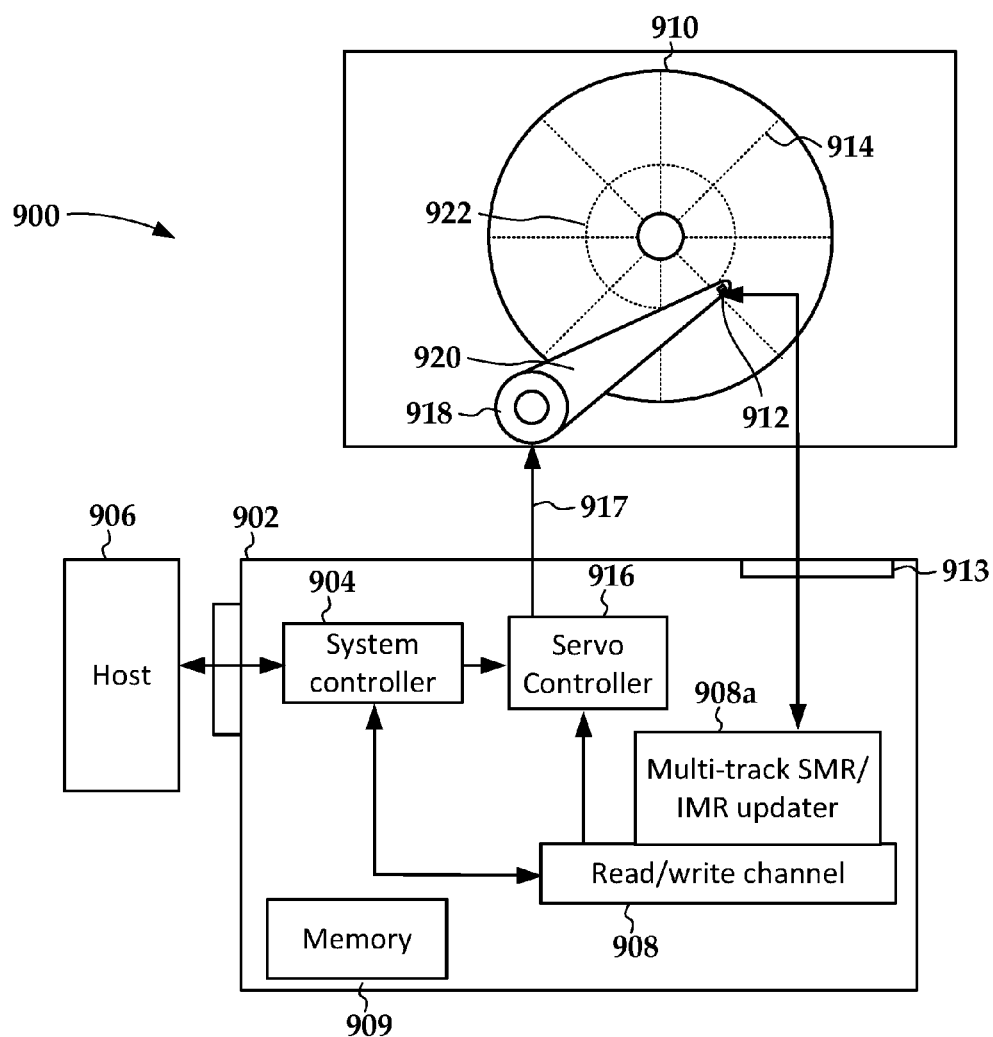
FIG. 9 is a block diagram of an apparatus according to an example embodiment.

In FIG. 9, a diagram illustrates components of a hard drive apparatus 900 that utilizes one or more read/write heads 912 according to example embodiments. The apparatus includes circuitry 902 such as a system controller 904 that processes read and write commands and associated data from a host device 906. The host device 906 may include any electronic device that can be communicatively coupled to store and retrieve data from a data storage device, e.g., a computer. The system controller 904 is coupled to a read/write channel 908 that reads from and writes to surfaces of one or more magnetic disks 910.

The read/write channel 908 generally converts data between the digital signals processed by the system controller 904 and the analog signals conducted through two or more HGAs 912 during read operations. At least one of the HGAs 912 includes two or more read transducers and may optionally include two or more write transducers. The read/write transducers may all be on the same slider body, or may be on two or more slider bodies that are commonly mounted to the same HGA 912.

The read/write channel 908 may include analog and digital circuitry such as decoders, timing-correction units, error correction units, etc. The read/write channel is coupled to the heads via interface circuitry 913 that may include preamplifiers, filters, digital-to-analog converters, analog-to-digital converters, etc. As shown in the figure, the read/write channel 908 utilizes a multi-track SMR and/or IMR updater 908a that manages updates to overlapped tracks recording to the disk 910. The updater 908a may at least receive a command (e.g., via system controller 904) to update a bottom track that is partially overlapped by one or more top tracks. The updater 908a concurrently reads (e.g., during one rotation of the disk 910 via two or more readers commonly mounted to a head gimbal assembly 912 or arm 920) at least the top track that overlaps the bottom track. Data of at least the top track(s) is stored in a memory 909. The updater then (e.g., during a subsequent rotation of the disk 910) writes the updated bottom track and writes the top track(s) using the stored data. The stored may be written over the original top tracks or may be written to tracks elsewhere.

The read/write channel 908 may facilitate buffering/caching data to memory 909 during writes to facilitate SMR and/or IMR writing. If the read/write head 912 includes multiple writers, the read/write channel 908 may send write data to multiple writers or to a selected subset of the writers during certain phases of write operations. The multiple writers may be of different type (e.g., HAMR, conventional) and may have different characteristics (e.g., crosstrack width, downtrack resolution, signal-to-noise ratio, skew, reader-to-writer offset, etc.) As such the writers may be optimized for particular types of tracks. Multiple readers may also have different characteristics (e.g., crosstrack width, downtrack resolution, signal-to-noise ratio, skew, reader-to-writer offset, etc.) that may be optimized for different types of tracks. The read/write channel 908 may be configured to read and write data differently for different zones of disk 910. For example, some zones may use different writing formats such as SMR, IMR, and conventional tracks.

In addition to processing user data, the read/write channel 908 reads servo data from servo wedges 914 on the magnetic disk 910 via the read/write head. All of the multiple readers of the read/write head may be used to read servo data, or only a subset thereof. The servo data are sent to a servo controller 916, which uses the data to provide position control signals 917 to a VCM 918. The VCM 918 rotates an arm 920 upon which the read/write heads 912 are mounted in response to the control signals 917.

Figure 10:
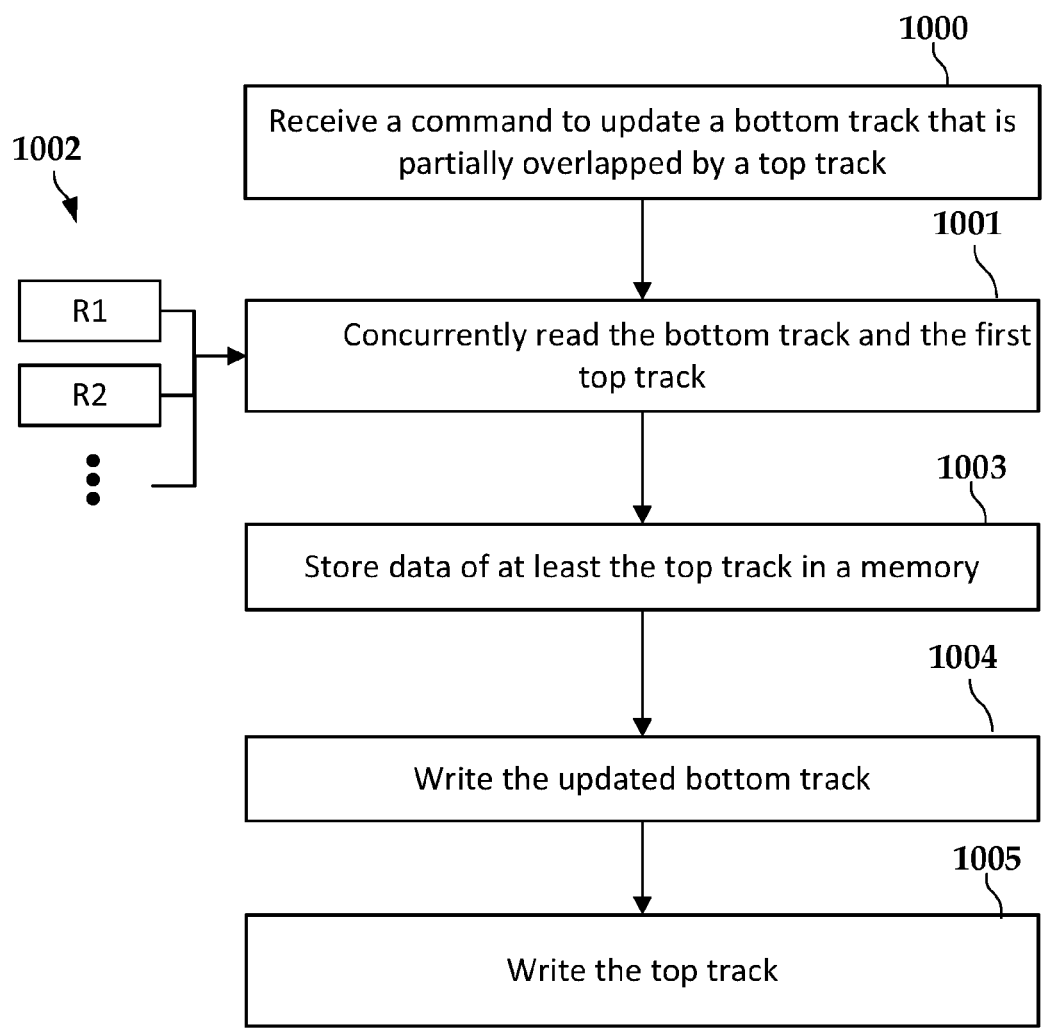
FIGS. 10 and 11 are flowcharts showing methods according to an example embodiment.

In reference now to FIG. 10, a flowchart illustrates a method according to an example embodiment. The method involves receiving 1000 a command to update a bottom track that is partially overlapped by a top track. Two or more readers 1002 concurrently read 1001 the bottom track and the top track. Data of at least the top track is stored 1003 in a memory. The data of the bottom track may also be stored in the memory, and/or may be used to decode the data of the top tracks. The updated bottom track is written 1004, and the first top track is written 1005, e.g., over the updated bottom track or elsewhere using the stored data. Writing 1004, 1005 may occur in any order, e.g., based on whether the top track is written in the same or different location.

Figure 11:
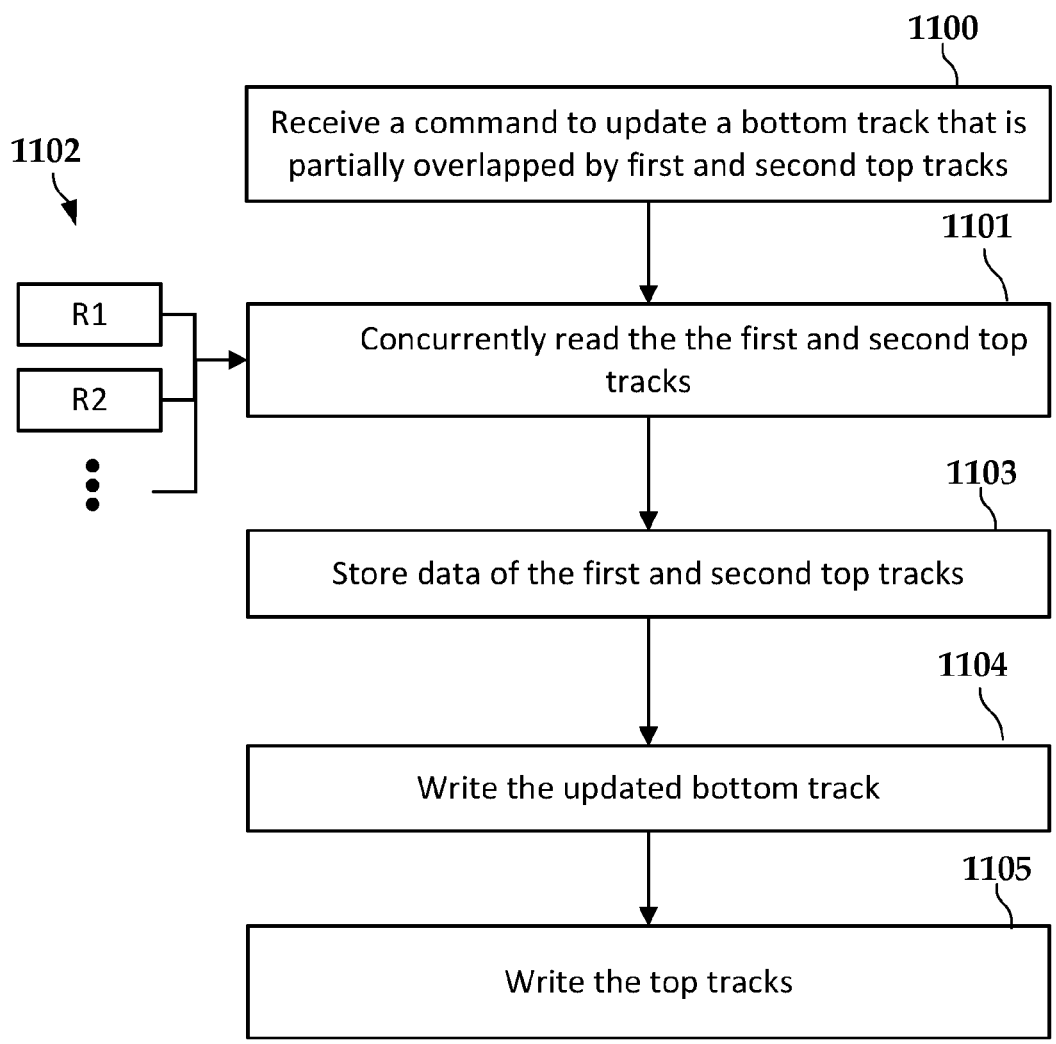

In reference now to FIG. 11, a flowchart illustrates a method according to another example embodiment. The method involves receiving 1100 a command to update a bottom track that is partially overlapped by at least one of first and second top tracks (e.g., IMR or SMR top tracks). Two or more readers 1102 concurrently read 1101 the first and second top tracks. Data of the first and second top tracks is stored 1103 in a memory. The updated bottom track is written 1104, and the top tracks are written 1105. Writing 1104, 1105 may occur in any order, e.g., based on whether the top track is written in the same or different location.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description, and is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    receiving a command having update data used to update a target track of a recording medium;
    concurrently reading, in response to the command, two or more tracks, the two or more tracks comprising a top track that partially overlaps the target track, the top track not targeted for update by the command;
    storing data read from the top track in a memory in response to the command;
    writing the update data over at least part of the target track, the writing of the update data invalidating a corresponding part of the top track; and
    rewriting the stored data of the top track on the recording medium.

2. The method of claim 1, wherein the two or more tracks comprise a second top track that partially overlaps the target track, data of the two tracks being stored in the memory.

3. The method of claim 2, wherein the two or more tracks have different track widths than the target track and a different linear bit density than the target track.

4. The method of claim 1, wherein the two or more tracks comprise a second top track that partially overlaps the top track, data of the second top track being stored in the memory.

5. The method of claim 1, wherein the two or more tracks comprise the target track, data of the target track being used to decode the top track.

6. The method of claim 1, wherein the two or more readers comprise three or more readers, the two or more tracks being read concurrently by the three or more readers.

7. The method of claim 1, wherein the two or more tracks are different than the target track, the method further comprising reading the target track via a third reader concurrently with reading of the two or more tracks.

8. The method of claim 1, wherein rewriting the stored data of the top track comprises rewriting the top track partially overlapping the updated target track.

9. The method of claim 1; wherein rewriting the stored data of the top track comprises rewriting the stored data in a different location than the top track; the method further comprising marking the top track as being available for writing of new data.

10. An apparatus comprising:
    interface circuitry configured to communicate with two or more readers configured to read data from a recording medium; and
    a controller coupled to the interface circuitry and configured to:
        receive a command to apply update data to a target track;
        via the two or more readers in response to the command, concurrently read two tracks different from the target track and not targeted for update by the command, at least one of the two tracks partially overlapping the target track, data read from the two tracks being stored in a memory;
        write the update data over the target track, the writing of the update data invalidating a corresponding part of the at least one of the two tracks; and
        rewrite the two tracks using the stored data.

11. The apparatus of claim 10, wherein the interface circuitry is configured to communicate with two or more writers, the controller configured to write the stored data to the recording medium concurrently via the two or more writers.

12. The apparatus of claim 11, wherein the two or more writers are configured to concurrently write the stored data on the same surface of the recording medium.

13. The apparatus of claim 11, wherein the two or more writers are configured to concurrently write the stored data on different surfaces of the recording medium.

14. The apparatus of claim 11, wherein the two or more readers comprise three or more readers, the target track and the two tracks being read concurrently by the three or more readers.

15. The apparatus of claim 14, wherein two tracks and the target track are interleaved, the target track having a different geometric characteristic than the two tracks, respective ones of the three or more readers being optimized for the respective different geometric characteristics.

16. The apparatus of claim 15, wherein the different geometric characteristics comprise at least one of track width and linear bit density.

17. The apparatus of claim 10, wherein the two tracks are shingled over the top track.

18. A system comprising:
    two or more readers configured to concurrently read a recording medium, the recording medium comprising a first track being overlapped by a second track in one of a shingled or interlaced track arrangement;
    a memory; and
    a controller coupled to the two or more readers and the memory, the controller configured to:
        receive a command to overwrite at least part of the first track with update data;
        in response to the command, read data of the first and second track in no more than one rotation of the recording medium via the two or more readers, the second track not targeted for update by the command;
        store data read from at least part of the second track in the memory in response to the command;
        write the updated data over the first track, the writing of the update data invalidating the at least part of the second track; and
        rewrite the second track partially overlapping the first track using the stored data.

19. The system of claim 18, wherein the first and second tracks have different track widths and different linear hit densities, and wherein the two or more readers are configured with different characteristics optimized for reading the first and second tracks.

20. The system of claim 18, wherein the two or more readers are mounted in the same head-gimbal assembly.

* * * * *